(No Model.)
P. G. DAUSCH.
THILL COUPLING.
No. 338,493. Patented Mar. 23, 1886.
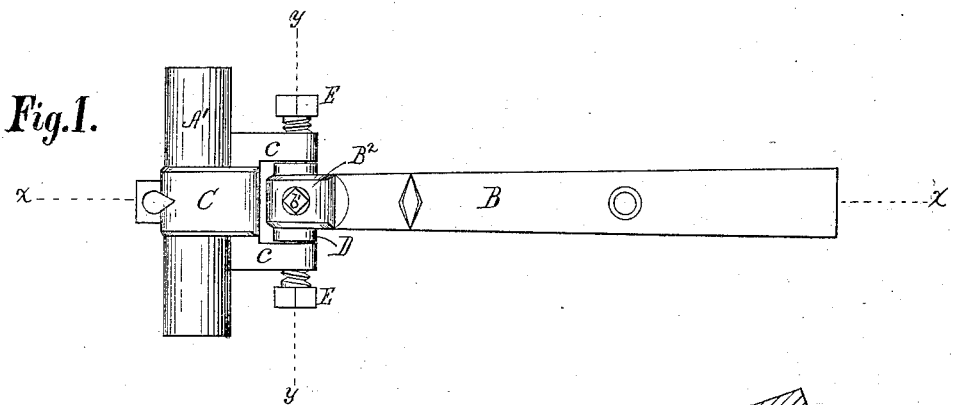
Fig. 1.
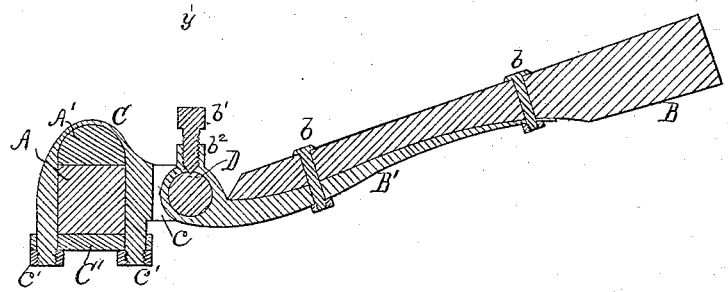
Fig. 2.
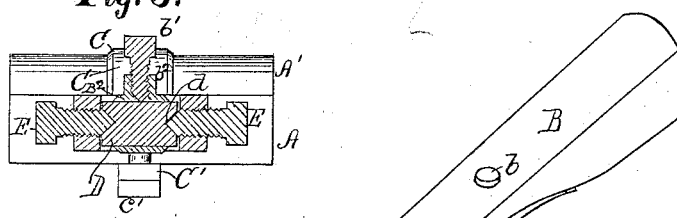
Fig. 3.
Fig. 4.
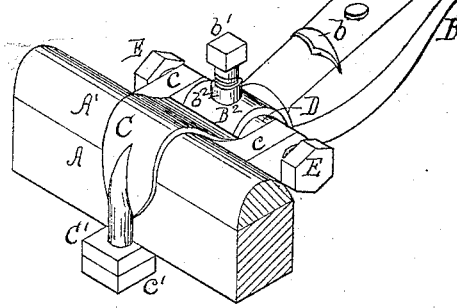
Witnesses:
W. M. Walker
E. M. Werle
P. G. Dausch
Inventor.
Per S. Brashears
Atty

UNITED STATES PATENT OFFICE.

PIERRE G. DAUSCH, OF BALTIMORE, MARYLAND.

THILL-COUPLING.

SPECIFICATION forming part of Letters Patent No. 338,493, dated March 23, 1886.

Application filed September 2, 1885. Serial No. 176,032. (No model.)

*To all whom it may concern:*

Be it known that I, PIERRE G. DAUSCH, a resident of Baltimore city, Maryland, have invented certain new and useful Improvements in Thill-Couplings, of which the following is a specification, reference being had to the accompanying drawings, forming part hereof, in which—

Figure 1 is a top plan view of part of an axle, with part of a thill or shaft connected thereto by my improved thill-coupling. Fig. 2 is a longitudinal section on the line $x\ x$ of Fig. 1. Fig. 3 is a transverse section on the line $y\ y$ of Fig. 1; and Fig. 4 is an isometric view of the parts shown in Fig. 1, and in the same relative position to each other.

Like letters of reference mark the same parts in all the figures.

My invention relates to devices for connecting the thills or shafts of vehicles to their axles; and it consists in the construction, arrangement, and combination of parts hereinafter described, and specifically pointed out in the claims.

Referring to the drawings by letters, A is the square iron portion, and A' the surmounted wooden portion of the axle.

B is the thill or shaft.

B' is the thill-iron, secured to the under side of the thill by means of bolts $b$.

$B^2$ is a ring or tube formed on the end of the shaft or thill-iron B', which is provided with a tubular threaded projection, $b^2$, to receive a conical pointed bolt, $b'$.

C is the clip, which encircles the axle. It is secured in position by a plate, C', and nuts $c'$, and has two projecting interior-threaded lugs, $c$.

D is a plug, cylindrical in exterior form, and provided at each end with a conical depression, $d$, to receive the points of two conical pointed bolts, E, which engage the threads in the lugs $c$. This plug D passes through the tubular end $B^2$ of the shaft-iron B', and is held from turning therein by the conical pointed screw $b'$.

The operation of my device is as follows, viz: The parts being detached, and it being desired to connect them, the plug D is inserted in the tube $B^2$, and secured rigidly therein by turning up bolt $b'$. The plug is now passed between the lugs $c$, bringing the ends opposite the ends of the bolts E, when the bolts are turned up into the depressions $d$ until sufficiently far therein to make a firm bearing. The shaft will be now coupled to the axle, and the parts moving upon each other as the shafts move up and down will be the points of bolts E and depressions $d$ in plug D, the bearing thus formed being conical, one not easy to wear.

Under no circumstances will it be necessary to renew any other parts except plug D or bolts E. These can easily be replaced, when worn out, at trifling cost.

The points mentioned as conical may be concave and convex, if desired.

I am aware that a thill-coupling having a solid shaft-iron with conical recesses and pointed screws passing through the clip lugs and bearing therein is not new, and do not, therefore, make any claim to such construction.

Having thus fully described my invention, what I claim, and desire to secure by Letters Patent, is—

1. The combination of axle and clip having lugs $c$, with shaft-iron, having tube $B^2$, plug D, and screws $b'$ and E, as and for the purpose set forth.

2. A thill-coupling consisting of an axle-clip having two interiorly-threaded lugs, conical pointed bolts therein, a shaft-iron having its end of tubular form, and a plug secured in said end removably and having end recesses to receive the points of the screws.

In testimony whereof I have hereunto signed my name in the presence of two witnesses.

PIERRE G. DAUSCH.

Witnesses:
 MURRAY HANSON,
 WILLIAM H. BERRY.